United States Patent
Barrere et al.

(10) Patent No.: US 10,120,717 B2
(45) Date of Patent: Nov. 6, 2018

(54) METHOD FOR OPTIMIZING THE SIZE OF A DATA SUBSET OF A PROCESSING SPACE FOR IMPROVED EXECUTION PERFORMANCE

(71) Applicant: THALES, Courbevoie (FR)

(72) Inventors: Rémi Barrere, Palaiseau (FR); Paul Brelet, Palaiseau (FR); Michel Barreteau, Palaiseau (FR); Eric Lenormand, Palaiseau (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/903,321

(22) PCT Filed: Jul. 9, 2014

(86) PCT No.: PCT/EP2014/064758
§ 371 (c)(1),
(2) Date: Jan. 7, 2016

(87) PCT Pub. No.: WO2015/004207
PCT Pub. Date: Jan. 15, 2015

(65) Prior Publication Data
US 2016/0147571 A1    May 26, 2016

(30) Foreign Application Priority Data
Jul. 10, 2013   (FR) ..................... 13 01633

(51) Int. Cl.
*G06F 9/50*    (2006.01)
*G06F 9/48*    (2006.01)
*G06F 11/34*   (2006.01)

(52) U.S. Cl.
CPC .......... *G06F 9/5011* (2013.01); *G06F 9/4881* (2013.01); *G06F 9/5066* (2013.01);
(Continued)

(58) Field of Classification Search
None
See application file for complete search history.

(56) References Cited

U.S. PATENT DOCUMENTS 7,743,087 B1  6/2010 Anderson
8,127,299 B2* 2/2012 Morich ................ G06F 9/5083
                                                  718/104

(Continued)

FOREIGN PATENT DOCUMENTS

WO   WO 2008/148624 A1   12/2008
WO   WO 2010/092483 A1   8/2010

OTHER PUBLICATIONS

Ren et al, SIMD Parallelization of Applications that Traverse Irregular Data Structures, 2013, IEEE, CGO'13, pp. 1-10.*
(Continued)

*Primary Examiner* — Abu Ghaffari
(74) *Attorney, Agent, or Firm* — Eric L. Lane; Green Patent Law (57) ABSTRACT

The invention relates to a method for optimizing the parallel processing of data on a hardware platform, the hardware platform comprising at least one computing unit comprising a plurality of processing units able to execute a plurality of executable tasks in parallel, the data to be processed forming a data set that can be broken down into data subsets, a same sequence of operations being performed on each data subset.

9 Claims, 3 Drawing Sheets

(52) U.S. Cl.
CPC ........ *G06F 9/5044* (2013.01); *G06F 11/3404* (2013.01); *G06F 2209/5017* (2013.01)

(56) References Cited

U.S. PATENT DOCUMENTS

| | | | | |
|---|---|---|---|---|
| 8,259,321 | B2* | 9/2012 | Zhang | G06F 3/1208 358/1.12 |
| 9,009,199 | B2* | 4/2015 | Asmundsson | G06F 17/30327 707/797 |
| 9,231,721 | B1* | 1/2016 | Varadarajan | H04J 3/1652 |
| 9,535,757 | B2* | 1/2017 | Suzuki | G06F 9/5022 |
| 2003/0055614 | A1* | 3/2003 | Pelikan | G06N 3/126 703/2 |
| 2008/0107336 | A1* | 5/2008 | Angrilli | G06T 7/12 382/173 |
| 2008/0282036 | A1* | 11/2008 | Ganesan | H04N 7/17336 711/129 |
| 2009/0106008 | A1 | 4/2009 | Branson | |
| 2011/0061057 | A1* | 3/2011 | Harris | G06F 9/5072 718/104 |
| 2011/0145828 | A1* | 6/2011 | Takahashi | H04L 67/1029 718/102 |
| 2011/0208872 | A1* | 8/2011 | Liddell | G06F 9/505 709/231 |
| 2012/0131584 | A1* | 5/2012 | Raevsky | G06F 8/45 718/102 |
| 2012/0166728 | A1* | 6/2012 | Garg | G06F 9/5016 711/120 |
| 2012/0185867 | A1 | 7/2012 | Archer | |
| 2013/0332446 | A1* | 12/2013 | Zhou | G06F 17/30584 707/713 |
| 2014/0188818 | A1* | 7/2014 | Hirsch | G06F 3/0641 707/692 |
| 2016/0147571 | A1* | 5/2016 | Barrere | G06F 9/5066 718/104 |

OTHER PUBLICATIONS

Vaidya et al, SIMD Divergence Optimization through Intra-Warp Compaction, 2013, ACM, ISCA'13, pp. 368-379.*
Narasiman et al, Improving GPU Performance via Large Warps and Two-Level Warp Scheduling, 2011, MICRO'11, pp. 308-317.*
International Search Report dated Jul. 31, 2014 in related International Application No. PCT/EP2014/064758.

* cited by examiner

METHOD FOR OPTIMIZING THE SIZE OF A DATA SUBSET OF A PROCESSING SPACE FOR IMPROVED EXECUTION PERFORMANCE

The present invention relates to a method for optimizing the parallel processing of data on a hardware platform comprising a plurality of processing units. The invention also relates to a computer program suitable for implementing the method for optimizing the parallel processing of data.

The invention more generally falls within the field of programming applications able to execute several tasks in parallel and process data in parallel, on specific hardware architectures.

Particularly considered are hardware architectures comprising a plurality of processing units or processing cores, or multi-cores, and/or multi-nodes. Multi-core Central Processing Units (CPU) or Graphics Processing Units (GPU) are examples of such hardware architectures.

A GPU video card comprises a large number of computing processors, typically hundreds, the terms "many-core" architecture or massively parallel architecture then being used. Initially dedicated to computations relative to processing graphic data, stored in the form of pixel tables with two or three dimensions, GPU video cards are currently used more generally on all types of scientific computation requiring a high computing power and parallel data processing.

Traditionally, the implementation of parallel data processing on a parallel architecture is done by designing a programming application using appropriate language making it possible to achieve both parallelism of tasks and parallelism of data. The OpenMP (Open Multi-Processing) or OpenCL (Open Computing Language) languages are examples of languages appropriate for this type of application.

Parallel programming languages offer many possibilities regarding the distribution of tasks to be performed, the number of tasks to be executed in parallel and the partitioning of data into data groups to be processed in parallel. Thus, the design of optimized programming code for parallel execution is difficult to obtain for the developer using the language.

Furthermore, optimization in terms of work time depends greatly on the architecture of the hardware platform on which the programming application code is executed. For example, typically, the number of tasks that can be executed in parallel depends on the number of available processing units, but the work speed also depends on the speed of memory access and data transfers.

Thus, it has been observed that the execution time for program application code varies depending on the hardware architecture of the processors or video cards used.

There is therefore a need to facilitate the generation of optimized programming code for the parallel processing of data on a hardware platform including a plurality of processing units.

A method is proposed for optimizing the parallel processing of data on a hardware platform, the hardware platform comprising:

at least one computing unit comprising a plurality of processing units able to execute a plurality of work items in parallel in a processing space, the processing space being a space in which a same sequence of operations is carried out on all of the data, the processing space being able to be broken down into processing subsets, each subset performing the same processing on a data subset, the method being characterized in that the method comprises the following steps:

obtaining a maximum number of work items executable in parallel by a computing unit of the hardware platform, determining sizes of the data subsets of the processing space through a same sequence of operations to obtain determined sizes, optimizing the size of at least one data subset of the processing space, the optimization comprising a step for:

selecting, for at least one considered subset, at least one integer number strictly greater than the determined size and multiple numbers smaller than the determined size of the considered subset, the number(s) smaller than the determined size of the considered subset preferably being 2, 4 or 8, generating, for each subset considered in the selection step, a computation subset having, as size, the integer selected from the subset and comprising all of the data of the considered subset, the computing subset replacing the data subset considered in the processing space, to obtain a new processing space, the optimization being implemented so as to obtain an improved execution performance measurement for the new processing space relative to the execution performance measurement obtained for the processing space in which the considered data subset has the determined size according to at least one chosen criterion, the measurement being associated with the execution of a program including program code instructions implementing a processing partition corresponding to the partitioning of the considered processing space into data subsets, and assigning at least one executable work item, able to execute said sequence of operations, to each data subset, the total number of executable items per data subset being less than or equal to said maximum number of items.

According to specific embodiments, the method comprises one or more of the following features, considered alone or according to any technically possible combinations:

the numbers smaller than the determined size of the considered subset come from a configurable file.

for each subset size, the optimization step comprises a step for determining the processing partition making it possible to minimize the execution performance measurement associated with the execution of a program including program code instructions implementing the processing partition.

the step for determining the processing partition further includes a step for determining at least two processing partitions, obtaining a program including programming code instructions implementing said processing partition, obtaining the value of an execution performance measurement associated with the selected criterion and with the execution of said program on said hardware platform, and selecting the processing partition making it possible to obtain an optimal measurement value respecting the chosen criterion.

the chosen criterion comprise a first criterion and a second criterion different from the first criterion, the step for determining the processing partition further including a step for determining at least two processing partitions, obtaining a program including programming code instructions implementing said processing partition, obtaining the value of execution performance measurements respectively associated with the first criterion and the second criterion and with the execution of said program on said hardware platform, first selection of processing partitions making it possible to obtain a plurality of optimal measurement values respecting the first chosen criterion and second processing partitioning selection making it possible to obtain an optimal measurement value according to the second criterion chosen among the processing partitions selected in the first selection step.

the method further includes a step for obtaining information making it possible to generate programming code instructions implementing said selected processing partition.

said value of an execution performance measurement associated with the first criterion is a work time on said hardware platform.

The present invention also relates to a computer program product including programming code instructions able to be implemented by a processor. The program is able to implement a method for optimizing the parallel processing of data on a hardware platform as previously mentioned.

To that end, also proposed is a method for optimizing the parallel processing of data on a hardware platform, the hardware platform comprising at least one computing unit comprising a plurality of processing units able to execute a plurality of executable tasks in parallel, and the data to be processed forming a data set that can be broken down into data subsets, a same sequence of operations being performed on each data subset. The method comprises the steps of obtaining a maximum number of executable tasks in parallel by a computing unit of the hardware platform, determining the sizes of the data subsets to be processed by a same sequence of operations, and optimizing the size of at least one data subset to be processed so as to obtain an improved execution performance measurement relative to the determined size according to at least one chosen criterion, the measurement being associated with the execution of a program including program code instructions implementing a processing partition corresponding to the partitioning of the data set into a number of data groups, and assigning at least one executable work item, able to execute said sequence of operations, to each data subset of said data group, the total number of tasks executable per data group being less than or equal to said maximum number of work items.

According to specific embodiments, the method as described in the previous paragraph comprises one or more of the following features, considered alone or according to any technically possible combinations:

the optimization step comprises a selection step, for at least one considered subset, at least one integer number strictly greater than the determined size and multiple numbers smaller than the determined size of the considered subset, the number(s) smaller than the determined size of the considered subset preferably being 2, 4 or 8, the numbers smaller than the determined size of the considered subset come from a configurable file.

the optimization step further comprises a step for generating a computing subset having, as size, the integer selected from the subset and comprising all of the data of the considered subset.

for each subset size, the optimization step comprises a step for determining the processing partition making it possible to minimize the execution performance measurement associated with the execution of a program including program code instructions implementing the processing partition.

the step for determining the processing partition further includes a step for determining at least two processing partitions, a step for obtaining a program including programming code instructions implementing said processing partition, a step for obtaining the value of an execution performance measurement associated with the selected criterion and with the execution of said program on said hardware platform, and a step for selecting the processing partition making it possible to obtain an optimal measurement value respecting the chosen criterion.

the chosen criterion comprise a first criterion and a second criterion different from the first criterion, the step for determining the processing partition further including a step for determining at least two processing partitions, a step for obtaining a program including programming code instructions implementing said processing partition, a step for obtaining the value of execution performance measurements respectively associated with the first criterion and the second criterion and with the execution of said program on said hardware platform, a step for first selection of processing partitions making it possible to obtain a plurality of optimal measurement values respecting the first chosen criterion and a step for second processing partitioning selection making it possible to obtain an optimal measurement value according to the second criterion chosen among the processing partitions selected in the first selection step.

the method further includes a step for obtaining information making it possible to generate programming code instructions implementing said selected processing partition.

said value of an execution performance measurement associated with the first criterion is a work time on said hardware platform.

The present invention also relates to a computer program including programming code instructions that can be implemented by a processor. The program is able to implement a method for optimizing the parallel processing of data on a hardware platform as previously mentioned.

Other features and advantages of the invention will appear upon reading the following description of embodiments of the invention, solely as an example and done in reference to the drawings, which are.

The invention will be described in its application to the optimization of programming code for a hardware platform comprising one or more GPU video cards, the programming code being in the OpenCL language.

More generally, the invention applies to any high-performance hardware platform with multiple processing units, in particular on heterogeneous platforms including both GPU video cards and general multicore processors, and with other programming languages appropriate for parallel programming.

The invention also applies when the hardware platform is made up of several high-performance hardware platforms, these platforms being able to communicate via network communications, for example by using "message passing".

Figure 1:
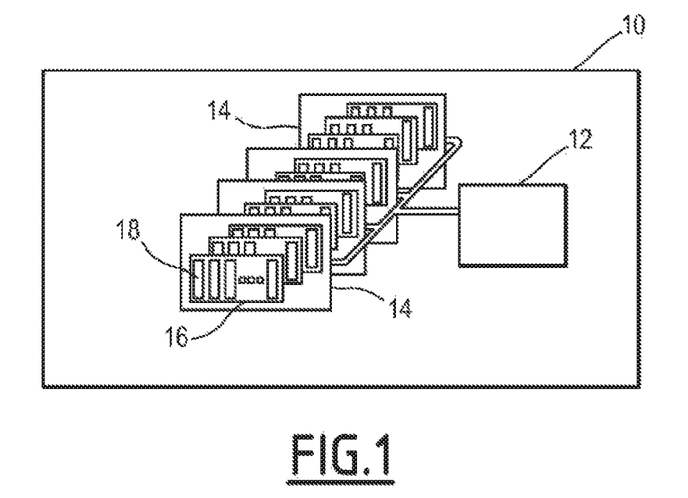
FIG. 1, a diagram of a hardware platform with multiple processing units.

As illustrated in FIG. 1, an example of such a hardware platform 10 comprises a server machine 12 and a set of computing devices 14.

The server machine 12 is appropriate for receiving the execution instructions and distributing the execution over all of the computing devices 14.

The computing devices 14 are multiprocessors. As an example, the computing devices 14 are GPU video cards.

There may be any number of computing devices 14. As an example, four computing devices 14 are shown in FIG. 1.

The computing devices 14 are either physically inside the server machine 12, or inside other machines, or computing nodes, accessible either directly or via a communication network. According to the example of FIG. 1, the computing devices 14 are accessible via a communication network.

The computing devices 14 are appropriate for implementing executable items transmitted by the server machine 12. Thus, the invention applies on a multi-node and/or multi-computing device distributed computing platform.

Each computing device 14 includes one or more computing units 16. In the case of FIG. 1, each computing device 14 comprises three computing units 16.

Each computing unit 16 comprises a plurality of processing units 18, or processing cores, in a "multi-core" architecture.

The server machine 12 comprises at least one processor and one memory able to store data instructions.

Furthermore, the server machine 12 is suitable for executing a computer program including code instructions implementing a method for optimizing the parallel processing of data as proposed.

For example, a program implementing the method for the optimization of the parallel processing of data as proposed is coded in a software programming language known as C or C++.

According to one alternative, the program implements the proposed method for optimizing the parallel processing of data into code instructions of the ISA (Instruction Set Architecture) type.

One particularly appropriate programming language for this type of hardware platform with a so-called many-core architecture is the OpenCL language.

The OpenCL language was designed more specifically for multi-core heterogeneous systems, for example comprising both a multicore CPU and one or more GPU video cards.

The OpenCL language makes it possible to manage both the parallelism of executable work items and the parallelism of data. The OpenCL language thus makes it possible to manage the parallel execution of work items on various available processing units and access to the data in separate memory areas.

Hereinafter, to simplify the description, the proposed method for optimizing the parallel treatment of data is described for a computing device 14 comprising only two computing units 16. The generalization to any number of computing unit 16 can be done directly therefrom.

Figure 2:
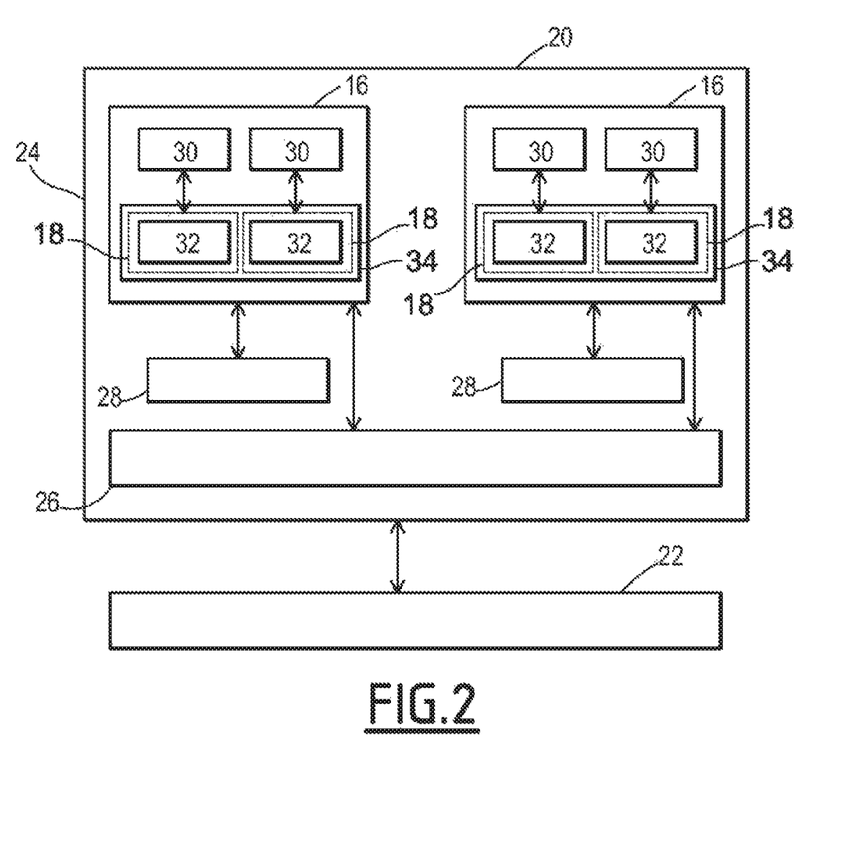
FIG. 2, a diagrammatic illustration of memory space sharing.

FIG. 2 illustrates the hierarchy of the memory spaces defined by OpenCL, allowing parallel access to data for the considered computing device 14.

The memory model 20 illustrated in FIG. 2 comprises a first memory space 22 and a second memory space 24.

The first memory space 22 is called "global" because the first memory space 22 is shared by the two computing units 16 of the computing device 14.

Furthermore, in the model proposed in FIG. 2, the global memory space 22 is outside the computing device 14. As an illustration, this is the case for a so-called "object"-type memory of a GPU video card.

The second memory space 24 comprises a constant memory space 26, two local memories 28 and four private memories 30.

The second memory space 24 is situated in the computing device 14.

The constant memory space 26 is able to store constant data for each read-only access for the two computing units 16 of the computing device 14 during the execution of a work item performing a sequence of computing operations.

Each local memory 28 is associated with a computing unit 16. Each local memory 28 is used by a task 32 of a group of tasks 34 executed by one of the two processing units 18 of the computing unit 16 of FIG. 2. In specification OpenCL 1.0, the task 32 is also called a "work item" and a group of tasks 34 is called a "work group".

Each computing unit 16 comprises two of the four private memories 30. Each private memory 30 is associated with a processing unit 18 of the computing unit 16.

Furthermore, each private memory 30 has an operation similar to the registers in a CPU with a single processing unit.

An OpenCL processing space is a space comprising n dimensions, where n is an integer comprised between 1 and 3.

As a result, it is possible to consider the processing space as a multidimensional matrix. Each element of the multidimensional matrix corresponds to an executable task 32 or "work item", performing a sequence of computing operations on a data subset of a data set to be processed.

In one simple example implementation, the data to be processed is values of the pixels of a digital image. The data set forms a two-dimensional table whose size is given by a first dimension p and a second dimension q. p and q are two non-zero natural integers.

In the particular case of an image taken in the "landscape" layout, the first dimension p is larger than the second dimension q.

Hereinafter, as an example, the first dimension p is equal to 1024 and the second dimension q is equal to 768.

As an illustration, it is assumed that digital processing is applied to these data. This digital processing is an executable work item 32.

It is, for example, considered to be a Fourier transform implemented in the form of an FFT function 1024. The acronym FFT refers to a "Fast Fourier Transform".

An FFT function 1024 makes it possible to obtain 1024 samples in the Fourier domain from a data subset of 1024 pixel values.

To apply it to the proposed two-dimensional table, the method used in practice to implement the FFT transform 1024 is to perform the FFT transform 1024 for each of the 768 data subsets of the table including 1024 pixel values.

The FFT transform 1024 therefore constitutes a sequence of operations applied on the 768 data subsets independently and therefore able to be done in parallel.

In this example, the processing space defining the set of executable work items to be performed on data subsets can be modeled as a one-dimensional table, each element of the table corresponding to a work item 32—computation of the FFT transform 1024—to be executed on a data subset, here a pixel value row.

Depending on the hardware platform, a maximum number of executable work items 32 can be executed in parallel by the processing units present.

In this example embodiment, if, at most, 128 work items 32 that are executable in parallel are available, there are several ways to associate these work items 32 with the 768 data subsets to be processed, which makes it possible to deduce several possibilities therefrom for processing partitioning.

Figure 3:
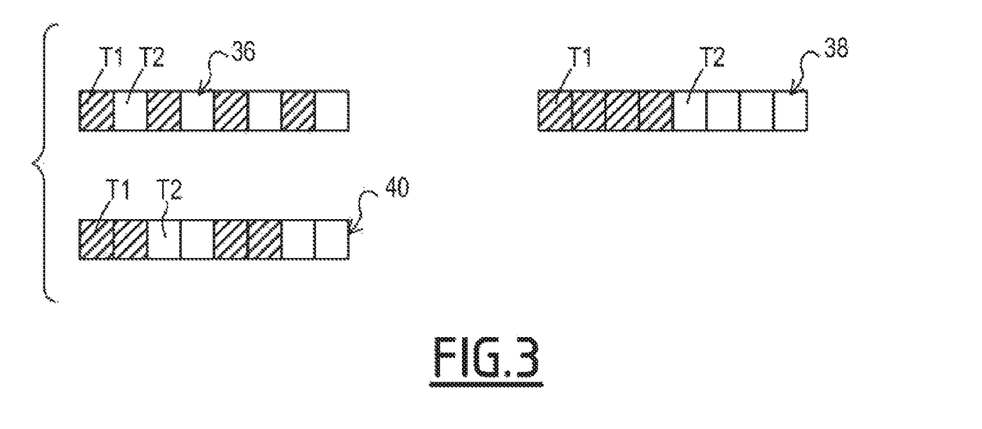
FIG. 3, an illustration of three processing partitions of a one-dimensional table, FIG. 4, a processing partition of a two-dimensional table, and FIG. 5, a flowchart of a method for optimizing the parallel processing of data according to the invention.

A diagrammatic illustration of processing partitioning relative to a one-dimensional processing space table is given in FIG. 3.

In this example, the table comprises eight work items or data subsets to be processed, and for simplicity of the explanation, only two processing units suitable for carrying out two executable work items T1, T2 in parallel are considered.

FIG. 3 shows three processing partitions 36, 38 and 40.

In each representation of the processing partitions, a crosshatched square represents processing by the work item T1 and a non-crosshatched square represents processing by the work item T2.

In the first processing partition 36, the work items in parallel that are available, T1 and T2, are distributed cyclically alternating.

In the second example processing partition 38, the available work items that can be executed in parallel are grouped together in blocks of four consecutive data subsets.

In the third example processing partition 40, the items T1 and T2 cover blocks of two consecutive data subsets, cyclically.

These various partitions in particular have an effect in terms of consecutive memory access done by each of the work items, and depending on the hardware architecture, the work times can differ, in particular due to read/write memory access times as well as data transfer times via the communication bus. In computers, this corresponds to the principle of spatial and temporal locality.

Figure 4:
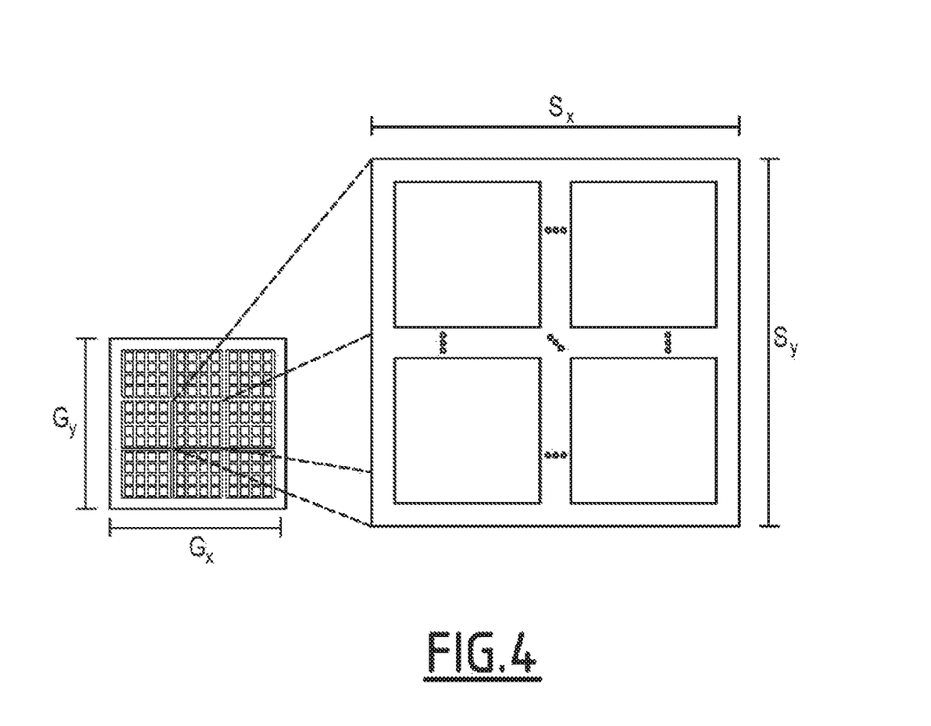

More generally, as illustrated in FIG. 4 with a two-dimensional table, OpenCL offers the possibility of defining the set of work items that can be executed in parallel to be performed on the data, the dimensions of the "global work size" table being denoted Gx and Gy in this example.

The elementary tasks or "work items" are grouped together in work groups each including a same number of work items 32, defined by the local work size, here defined by Sx and Sy.

The elementary work items of a work group are able to communicate and synchronize with one another for coordinated access to the local memory 28.

The work groups 34 are executed in parallel, and the maximum number of work items per work group 34 is limited by the limitations of the hardware platform.

While respecting the constraints of the hardware platform in terms of number of items able to launch in parallel, depending on the number of processing units 18, a very large number of processing partitions is possible, in particular when the processing space is multidimensional.

Figure 5:
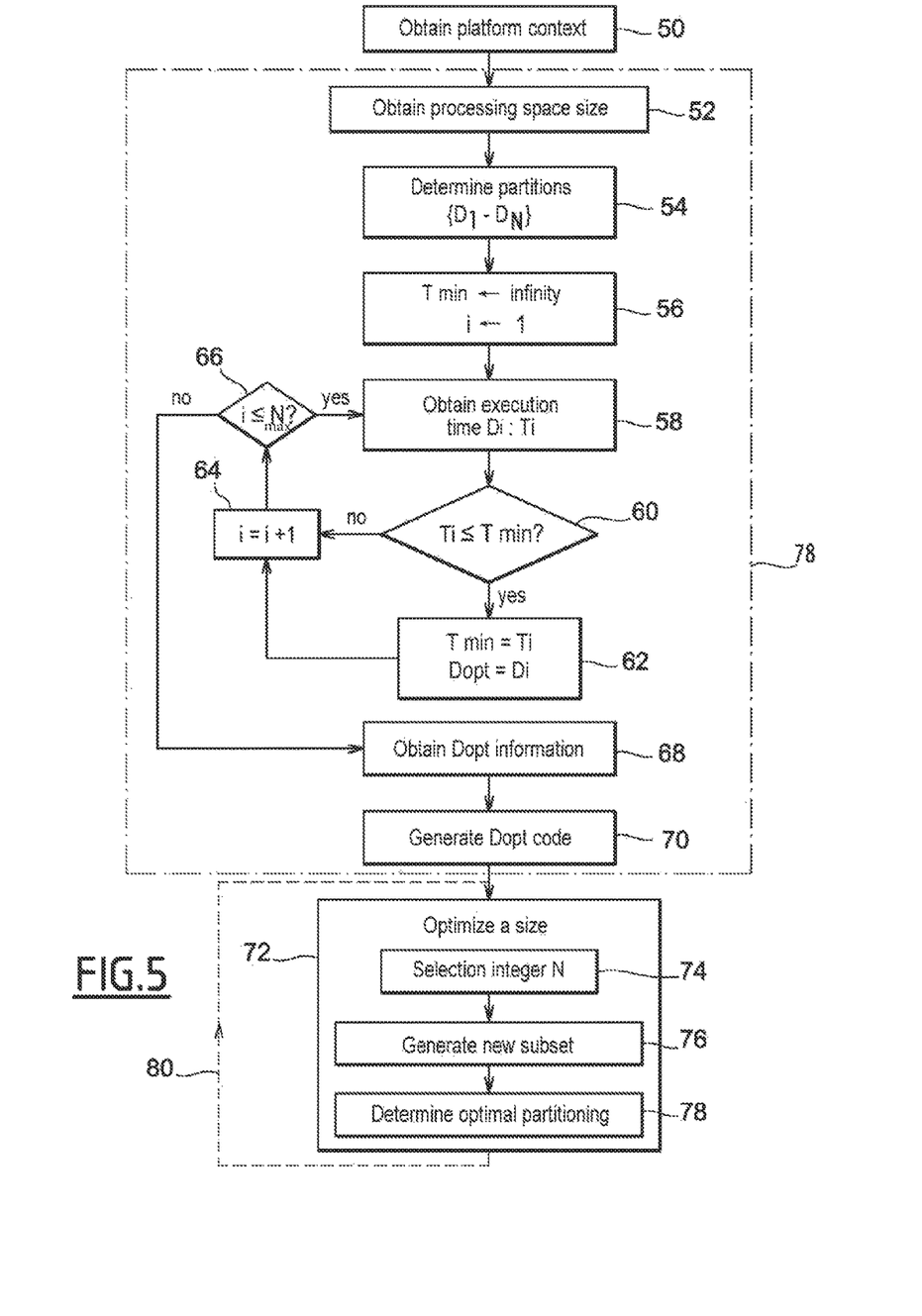

FIG. 5 is a flowchart of a method for optimizing the parallel processing of data according to the invention, the considered optimization in this example embodiment being an optimization terms of work time, the associated optimization criterion being the minimization of the work time.

The method is explained here for a given processing operation, in which input data to be processed are provided, and processed data are provided as output.

The processing is appropriate for parallel implementation, since the processing includes a repetition of the same sequence of operations, to be done on input data subsets.

Of course, a sequence of operations can be limited to a single operation done on a subset reduced to one input datum, for example one pixel of an image.

In one very simplistic example, an operation is considered consisting of adding a given value v to the value of all of the pixels of the image as previously described. The processing then consists of applying the same operation 1024×768 times, i.e., the addition of the value v. Mathematically, it can be written that, for any integer p comprised between 1 and 1024 and any integer q comprised between 1 and 768:

$$l'(p,q)=l(p,q)+v$$

Where:
l(p,q) is the value of the image at the pixel coordinates (p,q) before applying the processing,
l'(p,q) is the value of the image at the pixel coordinates (p,q) after applying the processing.

In terms of programming, the repetition of the sequence of operations is expressed in number of calculational loop turns, for example "for" loops in C language.

Furthermore, it should be noted that a function or application can comprise several successive processing operations that are independent of one another. In this case, the proposed method is applied similarly for each of the processing operations comprised in the functional application.

The method comprises a step 50 consisting of obtaining the context of the hardware platform 10 used.

Step 50 is a prior step usually executed only once.

In particular, step 50 comprises obtaining the maximum number of work items that can be executed in parallel by a computing unit 16 of the hardware platform 10.

For example, usually, NVIDIA® GTX video cards support a maximum number of 1024 work items executable simultaneously by a multiprocessor.

The method includes a step 52 for determining the sizes of the data subsets to be processed by a same sequence of operations. As previously explained, the sizes depend on the input data and sequencing operations to be performed. In terms of the OpenCL specification, this involves determining the "global work sizes", depending on its one, two or three dimensions, defining the multidimensional matricial processing space.

Several embodiments for implementing step 52 for determining the sizes of the data subsets to be processed are considered.

According to a first embodiment, at the input of the method, a program is provided including code instructions written in an appropriate language for executing a parallel code. This program is for example written in the OpenCL language. This program is not optimized for providing an execution configuration taking optimal advantage of the hardware platform.

In this case, the information corresponding to the sizes of the processing space is simply extracted from the code instructions of the non-optimized program provided as input.

Furthermore, typically, the provided program including non-optimized code instructions includes an initial "naïve" non-optimized partition, therefore an initial size for the local work size.

Alternatively, the method receives, as input, an application graph defining a functional application, including one or more processing operations to be done.

Each processing operation to be done is defined via the application graph.

In practice, it is possible to use an existing tool to manage an application graph from a functional application.

The step 52 for determining the size of the data subsets to be processed then consists of analyzing the application graph, then breaking it down into processing operations. For each given processing operation, the sequence of operations to be performed repetitively is identified as well as the number of calls or the number of loop turns to be computed, which is directly related to the quantity of data to be processed.

As an example, at the end of step 52 for determining the sizes of data subsets to be processed, for a three-dimensional processing space, the determined sizes are as follows:
global_work_size[0]=1999;
global_work_size[1]=32;
global_work_size[2]=16.

The method also includes a step 54 for determining a set of partitions of the processing space, or processing partitions, D1 to DN. Each processing partition corresponds to the partitioning of the data set in a number of data groups and the assignment of at least one executable task, able to execute the sequence of operations, to each data subset of the data group.

In practice, for a given computing device 14, each group of the partition includes the same number of data subsets, and the total number of work items executable by group is less than or equal to the maximum number of work items executable in parallel provided by the hardware platform, obtained in step 50 for extracting the context.

In terms of the OpenCL specification, determining partitions consists of determining various possible values of the local work size.

For example, for the three-dimensional processing space previously considered, the dimensions of which are as follows:
global_work_size[0]=1999;
global_work_size[1]=32;
global_work_size[2]=16.

The following partitions are tested:
D1: local_work_size[0]=1;
local_work_size[1]=1;
local_work_size[2]=1.

D1 corresponds to a local partition in 1999×32×16 work groups.

D2: local_work_size[0]=1;
local_work_size[1]=32;
local_work_size[2]=16.

D2 corresponds to 1999×1×1 work groups.

According to the preferred embodiment, all of the possible processing partitions are determined in step 54 for determining a set of processing partitions.

In the digital example explained above, the set of partitions comprises all of the possible ways of partitioning a matricial space with three dimensions measuring 1999×32×16 into groups of equal size, which yields a fairly high combinatorial, but which is manageable by automatic processing.

Alternatively, on a given number of processing partitions D, D≥2, is determined, by using one or more predetermined criteria, for example taking into account the maximum number of work items that can be executed in parallel by a computing unit 16 of the hardware platform 10.

The method includes a step 56 for initializing values. In this initialization step 56, an algorithmic parameter Tmin, intended, in this embodiment, to store the minimum execution time, is initialized at a very high value, for example the maximum available value.

Furthermore, in the initialization step 56, a counter i is initialized at the value one.

The method includes an obtaining step 58. In the obtaining step 58, a program including programming code instructions corresponding to the processing partition Di is generated and the execution of this program is launched on the hardware platform, in order to obtain a value of an execution performance measurement, which in this embodiment is a measurement of the actual execution time Ti associated with the processing partition Di.

In other words, other execution performance measurements, for example electricity consumption, or the heat dissipation associated with an execution or combination of different criteria, are implemented in place of the measurement of the execution time. For each measure implemented, an associated predetermined optimization criterion is taken into consideration, making it possible to select the corresponding optimal processing partition.

In practice, the processing is preferably done with any input data, and not with actual data from a functional application, since the execution time should not be dependent on the values of the input data. The different address hops being limited in the initial code, or even nonexistent, the use of any input data therefore makes it possible to considerably reduce the impact of the input data on the execution of each application.

Alternatively, in order to eliminate the influence of outside factors, the execution of the program corresponding to the processing partition Di is launched a given number of times, for example 10 times, and the time corresponding to the execution time is stored for each of the executions. Next, the minimum execution time is selected in the variable Ti.

More generally, the execution is launched a given number of times, and the measurement value Ti associated with the partition Di is obtained by computing a statistic of the stored values, for example the minimum, the mean or a higher order statistic. The computed statistic is stored as a measurement value Ti of the execution performance associated with the partition Di.

The method includes a step 60 for selecting a processing partition making it possible to obtain an optimal measurement value according to the predetermined criterion.

The selection step 60 comprises a test applied to determine whether the value of the execution time associated with the processing partition Di is below the value Tmin, the optimization criterion being the minimization of the execution time in this embodiment.

In case of a positive response, the method includes a step 62 in which the value of Tmin is set at the value Ti and the processing partition Di is recorded as the optimal processing partition Dopt. Step 62 follows the test. The method also comprises a step 64 for incrementing the counter i by one, step 64 following step 62.

In case of negative response to the test, therefore if the estimated work time is not less than Tmin, the method comprises step 64 for incrementing the aforementioned counter i.

The method then includes a test 66 intended to verify whether the maximum number of processing partitions has been reached.

If not, i.e., if i is less than or equal to the total number of partitions, the test 66 is followed by step 58 previously described.

Otherwise, all of the provided processing partitions have been tested, and the method comprises a step 68 for obtaining information relative to the processing partition having the shortest execution time, or optimal processing partition Dopt. The partition information is recovered, typically the information defining the local work size in the implementation of the OpenCL programming language.

At the end of step 68, for the described case, the three-dimensional processing space previously considered, the dimensions of which are as follows:
global_work_size[0]=1999;
global_work_size[1]=32;
global_work_size[2]=16,
the optimal processing partition Dopt is characterized by:
local_work_size[0]=1;
global_work_size[1]=1;
global_work_size[2]=16.

This information next makes it possible to generate programming code instructions implementing the optimal processing partition in terms of work time in step 70.

According to a first alternative embodiment in which the process according to the invention is applied with, as input, a program including programming code instructions of the non-optimized OpenCL type, step 70 typically consists of replacing the initial local work size values with the local work size values corresponding to the optimal processing partition.

According to a second alternative embodiment, in which the method according to the invention is applied with an application graph as input, step 70 consists of effectively generating a set of programming code instructions, in OpenCL language in this example embodiment, implementing the optimal processing partition.

According to one alternative, the programming code instructions corresponding to each partition generated in step 58 are stored in memory, and step 70 consists of simply recovering, in memory, the programming code instructions corresponding to the optimal processing partition Dopt.

It is of course understood that alternative embodiments, within the reach of one skilled in the art, are an integral part of the invention. For example, the steps for determining a processing partition and obtaining the associated work time are alternatively carried out in a single step.

The code obtained at the end of step 70 on a NVIDIA GTX 480 architecture has been tested by the applicant for the studied example. An execution time of 1480 milliseconds was obtained.

To still further improve this execution time, the method comprises a step 72 for optimizing the size of at least one data subset to be processed.

In the context of the invention, "optimization" means that the data subset having the optimized size makes it possible to obtain an improved execution performance relative to a data subset having the determined size according to the chosen criterion.

According to one preferred alternative, the optimized size is preferably the size for the considered data subset making it possible to obtain an optimal execution performance. The optimization is done on all sizes of the input table(s) arbitrarily by the user via the different first higher multiples (2, 3, 4, etc.) or relative to a database specific to the target including at the different desired first multiples. The work times are next recovered for each value of the input table, which allows us to compare them and deduce the minimum work time therefrom.

As an illustration, only the optimization of the "global_work_size[0]" is considered for the processing space given as an example. The generalization to several sizes is immediately apparent to one skilled in the art.

Step 72 comprises a step 74 for selecting at least one integer N greater than the determined size of the considered subset.

Preferably, the integer N is less than or equal to two times the determined size of the considered subset. This makes it possible to avoid computing too many possible combinations.

In the considered example, N is strictly greater than 1999.

Furthermore, the integer N is multiple numbers smaller than the determined size of the considered subset.

Several embodiments can be considered to choose numbers smaller than the determined size of the considered subset.

As an example, the numbers smaller than the determined size of the considered subset are the prime numbers comprised between 2 and 9, i.e., 2, 3, 5 and 7, and the integer N is the first multiple of one of the prime numbers.

In this case, the integer selected at the end of step 74 is 2000.

Alternatively, the integer N is the first multiple of the different prime numbers 2, 3, 5 and 7. In this case, the integer selected at the end of step 74 is 2100.

Alternatively, the numbers below the determined size of the subset being considered are 2, 4 and 8. Choosing multiples of two is favorable inasmuch as the architectures generally contain an even number of cores.

Multiples other than multiples of two can be considered depending on the specific architecture of the computer system in question.

According to still another alternative, numbers below the determined number of the considered subset come from a configurable file.

For example, this configurable file is adapted to the implementation of a selection method involving a learning technique.

The learning criteria are defined based on a choice by an expert. The expert identifies the partitions that he considers to be most relevant.

By successive identification, the learning technique makes it possible to obtain automatic selection criteria.

As a result, the number of multiples to be tested is decreased. The time to implement the method thus decreases greatly.

Alternatively, instead of involving a single expert, the choices of several experts are used to identify the most relevant partitions. This makes it possible to benefit from the know-how of several experts in a single method.

Below, it is assumed that one of the integers selected at the end of step 74 is 2000.

Step 72 then comprises a step 76 for generating a computation subset having, as size, the integer selected from the subset and comprising all of the data of the considered subset.

It is thus proposed to complete the subset with fictitious data to obtain a new three-dimensional processing space previously considered, the dimensions of which are as follows:
global_work_size[0]=2000;
global_work_size[1]=32;
global_work_size[2]=16.

Step 72 comprises a step 78 for determining the optimal partition for this new processing space.

As an example, step 78 is implemented by applying steps 52 to 70 to the new three-dimensional processing space. This example embodiment is indicated diagrammatically by a dotted box in FIG. 5.

At the end of step 78, the optimal processing partition Dopt obtained is characterized by:
local_work_size[0]=80;
local_work_size[1]=1;
local_work_size[2]=2.

Furthermore, the code obtained at the end of step 78 on a NVIDIA GTX 480 architecture has been tested by the applicants for the studied example. An execution time of 170 milliseconds was obtained.

Thus, an increase has been observed in the work speed of a processing operation going up to a factor of ten between programming according to an optimal processing partition on a data space to be processed and programming according to an optimal processing partition on a data space to be processed with an optimized size.

In the illustrated case, 32*16 additional operations are performed, but the better partitioning of the computations on the parallel cores makes it possible to save work time exceeding the delay related to performing the 32*16 additional operations.

Of course, it is possible to iterate step 72 as many times as desired to try to further decrease the work time. In the case previously described, after a value of 2000 for the size of the global_work_size[0], the operation corresponding to step 72 is reiterated with the integer N=2001 (because first multiple of 3 from 1999) chosen in step 74 for the selection of at least one integer N, then the operation corresponding to step 72 is reiterated for all of the first multiples of the list, if and only if they have not already been used. As an example, the integer N=2000 will only be used once for the partition, even though it is a multiple of 2 and 5. This possibility of reiterating step 72 is indicated by the dotted arrow 80 in FIG. 5.

The optimized size obtained at the end of step 72 will correspond to the size yielding the lowest work time.

According to still another alternative, the step for selecting processing partitions making it possible to obtain an optimal measurement value according to the chosen criterion, several partitions meet the chosen criterion. To select one partition from among the selected processing partitions, it is additionally proposed to use another chosen criterion. In this case, the criterion chosen in the partition selection step is the first criterion, called the major criterion, while the other criterion is a second criterion, qualified as secondary criterion.

The method thus includes a first selection step according to the first criterion making it possible to obtain a plurality of processing partitions and a second selection step according to the second criterion making it possible to select a processing partition. In this sense, the first selection step is a coarser selection step than the second selection step.

The second selection step is for example implemented by a data sort. Any other embodiment making it possible to determine among the processing partitions selected in the first selection step is, however, possible.

As an illustration, if the studied application is a real-time application, the first criterion is a work time performance criterion of the application and the second chosen criterion is then a lower electricity consumption criterion during the work. The partition obtained thus has a computing time below a given limit with a lower consumption. Implementing the method then makes it possible to obtain a partition having a computing time respecting the real-time constraints given and at least partially resolving the issues of green computing.

According to another example, the studied application is a non-real-time onboard application. In this case, the first criterion is the compliance with a given thermal design power and the second criterion is a performance criterion in terms of work time of the application. Implementing the method then makes it possible to obtain a partition that has an optimal computing time while respecting implementation constraints.

Thus, in this alternative, the implementation of the method then makes it possible to obtain a partition respecting two criteria. This is particularly advantageous when the application of the first criterion yields a plurality of solutions. It should also be noted that the first criterion can be modified so that a plurality of solutions exist. For example, the application work time can be longer than the optimum time if the user does not perceive any difference. Thus, a partition will be chosen not corresponding to the optimal work time, but remaining fast enough relative to the targeted application to respect another advantageous secondary criterion.

To improve this effect, according to one embodiment, a plurality of selection steps are carried out by modifying the criterion in each selection step. For example, the method includes a first selection step for processing partitions according to a first criterion, which is the major criterion, then a second selection step for processing partitions according to a second criterion among the processing partitions selected in the first selection step, then a third selection step for processing partitions according to a third criterion among the processing partitions selected in the second selection step, and a fourth selection step for a processing partition according to a fourth criterion among the processing partitions selected in the third selection step. The four criteria are different. Thus, at the end of this method, a partition is obtained verifying all four criteria.

The invention has been described more particularly in the case of use of the OpenCL parallel programming language. Alternatively, it is for example possible to use the inventive method for optimizing parallel processing with other parallel programming languages with a similar behavior, for example the CUDA language, which is a proprietary language of NVIDIA.

The CUDA terminology expresses the partition in "thread blocks" and "grid", expressed in a n-dimensional space, with n comprised between 1 and 3 (matrices with three dimensions):
- the "blocks" determine the number of work items executable in parallel on the computing units 18 of a same computing unit 16. They are equivalent to the "local_work_size" in the OpenCL language.
- the "grid", which expresses the number of "blocks" that will be repeated to perform all of the processing to be done.

The adaptation of the inventive method applied to the CUDA language will vary the size of the blocks and the grid, so as to determine the optimal block/grid size within the meaning of the predetermined criterion, which makes it possible for example to achieve better performance in terms of computing time or lower electrical consumption. Indeed, in the case of the application of the CUDA language, varying the sizes of the blocks and grid amounts to performing multiple processing partitions, these various processing partitions next being tested to determine an optimal processing partition within the meaning of the predetermined criterion, as explained in the embodiment outlined above in reference to FIG. 5.

Advantageously, the invention makes it possible to optimize the parallel processing of the data adaptively relative to any available hardware platform.

It should also be noted that the invention also works for testing and reliability procedures.

As an example, if one core of a quad-core architecture is defective, it is possible to implement the invention on only three out of the four cores.

By extension, this property shows the configurability of the proposed method. In particular, in the same example as before, if the user of the method chooses to allocate a core of a quad-core architecture for another application, it is possible to implement the method by applying it to the available three-core architecture. For the user of the method, this makes the method adaptable to the specific use of the cores of the considered architecture, handling the availability of those cores.

The invention claimed is:

1. A method for optimizing the parallel processing of data on a hardware platform, the hardware platform comprising:
at least one computing unit comprising a plurality of processing units executing a plurality of work items in parallel in a processing space, the processing space being a space in which a same sequence of operations is carried out on data, the data being broken into data subsets, the processing space being broken down into processing subsets, each processing subset performing the same processing on a data subset;
wherein the method comprises the following steps:
obtaining a maximum number of work items executable in parallel by a computing unit of the hardware platform,
determining sizes of data subsets of the processing space through a same sequence of operations to obtain determined sizes,
optimizing the determined size of at least one data subset of the processing space, the optimization comprising a step for:
selecting, for the at least one data subset, at least one positive integer number strictly greater than the determined sire of the selected data subset, the positive integer being a multiple of numbers smaller than the determined size of the selected data subset,
generating, for the at least one data subset selected in the selection step, a computation subset having, as size, the positive integer selected from the at least one data subset and comprising all data of the at least one data subset, the computation subset replacing the at least one data subset selected in the processing space, to obtain a new processing space,
the optimization being implemented so as to obtain an improved execution performance measurement for the new processing space relative to the execution performance measurement obtained for the processing space in which the selected data subset has the determined sire according to at least one chosen criterion, the measurement being associated with the execution of a program including program code instructions implementing a processing partition corresponding to the partitioning of the new processing space into processing subsets, and assigning at least one executable work item, executing said sequence of operations, to each data subset, the total number of executable items per data subset being less than or equal to said maximum number of work items.

2. The method according to claim 1, wherein the numbers smaller than the determined size come from a configured file.

3. The method according to claim 1, wherein the optimization step comprises, for each subset size, a step for:
determining the processing partition to maximize the execution performance measurement associated with the execution of a program including program code instructions implementing the processing partition.

4. The method according to claim 3, wherein the step for determining the processing partition further includes a step for:
determining at least two processing partitions,
obtaining the program including the program code instructions,
obtaining the value of an execution performance measurement associated with the at least one chosen criterion and the execution of said program on said hardware platform,
selecting a processing partition from the at least two determined processing partitions to obtain an optimal measurement value respecting the chosen criterion; and
implementing said selected processing partition.

5. The method according to claim 3, wherein the at least one chosen criterion comprises a first criterion and a second criterion different from the first criterion, and wherein the step for determining the processing partition further includes a step for:
determining at least two processing partitions,
obtaining a program including programming code instructions implementing said selected processing partition,
obtaining the value of execution performance measurements respectively associated with the first chosen criterion and the second chosen criterion and with the execution of said program on said hardware platform,
a first selection step of processing partitions making it possible to obtain a plurality of optimal measurement values respecting the first chosen criterion,
a second selection step of the processing partition to obtain an optimal measurement value according to the second chosen criterion from among the processing partitions selected in the first selection step.

6. The method according to claim 4, wherein the method further includes a step for:
obtaining information relative to the processing partition having a minimum execution time, in order to generate programming code instructions implementing said selected processing partition.

7. The method according to claim 1, wherein a value of an execution performance measurement associated with the first chosen criterion is an execution time of the application on said hardware platform.

8. A non-transitory computer program product including programming code instructions able to be implemented by a processor, implementing the method for optimizing the parallel processing of data on a hardware platform according to claim 1.

9. The method according to claim 1, wherein in the optimization step, the numbers smaller than the determined size of the selected subset are 2, 4 or 8.

* * * * *